(12) United States Patent
Sasaki

(10) Patent No.: US 7,832,565 B2
(45) Date of Patent: Nov. 16, 2010

(54) STRUCTURE OF HOUSING BATTERY ETC.

(75) Inventor: Satoru Sasaki, Iida (JP)

(73) Assignee: OMRON Corporation, Kyoto (JP)

( * ) Notice: Subject to any disclaimer, the term of this patent is extended or adjusted under 35 U.S.C. 154(b) by 113 days.

(21) Appl. No.: 11/870,046

(22) Filed: Oct. 10, 2007

(65) Prior Publication Data

US 2008/0087571 A1 Apr. 17, 2008

(30) Foreign Application Priority Data

Oct. 11, 2006 (JP) ............................. 2006-277371

(51) Int. Cl.
*B65D 6/00* (2006.01)

(52) U.S. Cl. .................... 206/703; 455/128; 455/90.3; 455/347; 379/419; 361/752

(58) Field of Classification Search .................. 206/1.5, 206/703, 305, 320; 455/90.3, 347, 128; 292/304, 292/256.75; 379/419; 361/752, 679.58, 361/801, 679.01; 220/4.02, 3.94, 3.8, 3.7, 220/3.2; 174/562, 561, 560, 559, 520; D13/133
See application file for complete search history.

(56) References Cited

U.S. PATENT DOCUMENTS

| | | | | |
|---|---|---|---|---|
| 6,814,225 B2 * | 11/2004 | Belden et al. | ................ | 206/1.5 |
| 7,383,029 B2 * | 6/2008 | Sasaki et al. | ................ | 455/128 |
| 7,431,154 B2 * | 10/2008 | Perez et al. | ................ | 206/1.5 |
| 2005/0143029 A1 * | 6/2005 | Sasaki et al. | ................ | 455/128 |
| 2005/0183981 A1 * | 8/2005 | Gelardi | ................ | 206/531 |

FOREIGN PATENT DOCUMENTS

| | | | |
|---|---|---|---|
| FR | 2 714 565 A | | 6/1995 |
| JP | 56-82570 A | | 7/1981 |

(Continued)

OTHER PUBLICATIONS

Extended European Search Report issued in European Application No. EP 07 11 7962 mailed on Dec. 19, 2007, 5 pages.

*Primary Examiner*—Ehud Gartenberg
*Assistant Examiner*—Andrew Perreault
(74) *Attorney, Agent, or Firm*—Osha • Liang LLP

(57) ABSTRACT

A structure of housing is to be arranged in such a way as not to involve a complication of a manufacturing process or damage to a sealing rubber, and moreover, not to involve a decrease in a mounting area of an electronic substrate, either. A transmitter includes: a casing; a sealing rubber which covers an inner surface of the casing; an electronic substrate fitted inside the sealing rubber; and an inner plate for preventing the electronic substrate from dropping off and housing a battery, wherein the inner plate, as well as having a structure which can take an aspect of a bent condition, in which it is bent with a thin-walled parting line portion as a border, or a straightened condition, in which it is in an approximately flush aspect, has one or more long holes, and has provided on one longitudinal edge of the long holes, arms of which proximal portions are swingably attached thereto, and furthermore, on the other longitudinal edge of the long holes, engagement portions which can be engaged with leading ends of the arms.

6 Claims, 11 Drawing Sheets

FOREIGN PATENT DOCUMENTS

| | | |
|---|---|---|
| JP | 11-81762 A | 3/1999 |
| JP | 2001-339176 A | 12/2001 |
| JP | 2003-90152 A | 3/2003 |
| JP | 2003-201781 A | 7/2003 |
| JP | 2005-159221 A | 6/2005 |

* cited by examiner (Prior Art)

STRUCTURE OF HOUSING BATTERY ETC.

BACKGROUND OF THE INVENTION

1. Field of the Invention

The present invention relates to a structure of housing a battery etc. More particularly, it relates to a structure of housing a battery etc. in an instrument (for example, a remote keyless entry system transmitter or the like) which requires a reliable waterproofing performance, and needs an operation of replacing a built-in battery.

2. Description of Related Art

A remote keyless entry system is a convenient system with which it is possible to carry out a locking/unlocking of a door and the like, without using a mechanical key, simply by operating a push button of a transmitter contained in as small a casing as a matchbox. Also, as a progressive type of this, there is also a system which has eliminated a need to operate the push button of the transmitter. In the progressive type system, it is possible to carry out a locking/unlocking of a vehicle door by pressing an entry button while wearing the transmitter, and it is not necessary to take the transmitter out of a pocket each time.

As such transmitters are all used outdoors, waterproofing measures against wet weather and the like are indispensable. Also, as all of them operate with a disposable battery, an easiness of the operation of replacing the battery must also be considered.

<First Related Art>

FIG. 7 is a view showing a first related art (refer to, for example, JP-A-11-81762 ([0038] to [0039], FIG. 3) (Patent Document 1)). In the figure, a transmitter 100 has: a main body 101, as small as a matchbox, configured of upper and lower halved casings 101a and 101b; a battery 102 which is housed in a battery housing portion 101d inside the main body 101 via a battery housing hole 101c opened in a bottom surface of one casing 101a; a waterproof O-ring 103 attached to a peripheral edge of the battery housing hole 101c; and a circular lid 104 which closes the battery housing hole 101c in a condition in which the O-ring 103 is nipped. Various kinds of push button such as, for example, a locking button and an unlocking button, are provided on a surface (a surface which is hidden out of sight at the back) of the other casing 101b.

An advantage of the first related art lies in that an operation of replacing the battery 102 is easy. That is, it lies in that, by fitting a coin or the like at hand in a groove 104a of the circular lid 104 and turning it, it being possible to easily remove the circular lid 104, it is possible to replace the battery 102 without requiring a special tool.

Meanwhile, in the first related art, there is the following disadvantage. Firstly, as there is less empty space on a surface of the main body 101, a range being narrow to which can be attached, for example, a maker emblem, a radiowave authentication seal or the like, there is no design freedom. That is, as the battery housing hole 101c and the circular lid 104 exist on a surface of the casing 101a, and furthermore, the various kinds of push button exist on the surface of the casing 10b, there is a disadvantage that the maker emblem, the radiowave authentication seal or the like can be attached only to a very narrow range avoiding them. Also, although one of waterproof places of the transmitter 100 is between the battery housing hole 101c and circular lid 104 of the casing 101a, there is also a disadvantage that, in the event that an attachment error of the O-ring 103, or a failure to attach it, occurs during the operation of replacing the battery 102, rain water enters therefrom, causing damage to the electronic substrate inside the main body 101.

<Second Related Art>

FIG. 8 is a view showing a second related art (refer to, for example, JP-A-2003-201781 ([0042], FIG. 2) (Patent Document 2), JP-A-2003-90152 ([0077], FIG. 2) (Patent Document 3) and JP-A-2001-339176 ([0012] to [0015], FIG. 2) (Patent Document 4)). In the second related art too, in the same way as in the heretofore described first related art, a transmitter 105 has a main body 106, as small as a matchbox, configured of upper and lower halved casings 106a and 106b, but a "circular lid for battery replacement" such as the one of the heretofore described related art does not exist. It is arranged in such a way as to replace a battery 107 by disassembling the upper and lower halved casings 106a and 106b each time it is necessary. This kind of battery replacement method is referred to as a "casing disassembly method".

A spring terminal 106c abutting against one electrode of the battery 107, a conductive sheet 106d making electrical connection with the spring terminal 106c, and a waterproof seal 106e on a peripheral edge of an opening of the casing 106a are attached to an inner surface of one casing 106a, and also, a spring terminal 106f abutting against the other electrode of the battery 107, an electronic substrate 108 mounted with a prescribed electronic circuit which operates with a terminal voltage of the battery 107 supplied via these two spring terminals 106c and 106f as a power source, and a holding body 106g which holds and positions a periphery of the battery 107, are attached to an inner surface of the other casing 106b.

The second related art has a number of advantages as follows. That is, as no circular lid for battery replacement exists, sufficient empty space on a surface of the main body 106 is secured. Consequently, there is an advantage that a degree of freedom of attachment of the maker emblem, the radiowave authentication seal or the like is high. In addition, there is an advantage that, by causing the upper and lower halved casings 106a and 106b to have an elastic fit (a snap connection), it is possible to easily disassemble the main body 106 using, for example, a coin or, as the case may be, a fingernail, without requiring a special tool, and easily carry out the replacement of the battery 107. Moreover, as a waterproof place is limited to only one place (the waterproof seal 106e) between the upper and lower halved casings 106a and 106b, there is an advantage that, by adhesively fixing the waterproof seal 106e, it is possible to avoid a peeling off or the like of the waterproof seal 106e during the operation of replacing the battery 107. From these advantages, many of today's remote keyless entry system transmitters employ this casing disassembly method.

Meanwhile, in the heretofore described second related art (the casing disassembly method one), although there are excellent advantages in that the degree of freedom of replacement of the maker emblem, the radiowave authentication seal or the like is high, the battery replacement is easy, and a waterproofing performance can be maintained, due to the method of replacing the battery 107 by disassembling the upper and lower halved casings 106a and 106b, it has happened that a dropping off of the electronic substrate 108 is caused during the replacement operation. In order to avoid this, for example, as shown in FIG. 8, a measure to fix the electronic substrate 108 to the casing 106b with a screw 109 is taken in some cases, but this kind of screwing measure is not preferable because it involves a complication of a manufacturing process.

<Third Related Art>

In response to this disadvantage, Patent Document 4 proposes the following improved structure (a third related art).

FIG. 9 is a sectional view of a main portion at a transmitter assembly time, showing the third related art (a view of a main portion extracted from FIG. 2 in Patent Document 4). In the figure, first of all, an elastic piece 111a of an inner casing 111 is engaged with a peripheral edge of an electronic substrate 110 and, in the engaged condition, the electronic substrate 110 and the inner casing 111 are fitted into a sealing rubber 112. After that, the assembled body (the electronic substrate 110+the inner casing 111+the sealing rubber 112) are pushed into an outer casing 113, engaging a projection 112a (a pressure deformed portion caused by a convex portion 111b of the inner casing 111) of the sealing rubber 112 with a depression 113a in an inner peripheral side surface of the outer casing 113. By assembling in this way, eventually, the outer casing 113, the sealing rubber 112, the inner casing 111 and the electronic substrate 110 are integrated, and it does not happen that the electronic substrate 110 drops off during the battery replacement.

However, in the third related art, although it is possible to avoid the dropping off of the electronic substrate 110 during the battery replacement, the following problem can be considered. That is, when fitting the electronic substrate 110 and the inner casing 111 into the sealing rubber 112, as a strong friction occurs between the projection 112a of the sealing rubber 112 and a projection 113b of the outer casing 113, in some cases, there is a possibility of involving damage, such as a breakage, to a portion of the sealing rubber 112 subjected to the friction.

<Fourth Related Art>

As a related art which has eliminated this kind of disadvantage, the following one (a fourth related art) is known.

FIGS. 10A and 10B are views showing the fourth related art (refer to, for example, JP-A-2005-159221 ([0028] to [0031], FIG. 1) (Patent Document 5). A transmitter in the fourth related art includes an upper casing 114 having a box shape with a bottom, a sealing rubber 115 which covers an inner surface of the upper casing 114, an electronic substrate 116 fitted inside the sealing rubber 115, and an inner plate 117 which prevents a dropping off of the electronic substrate 116.

The inner plate 117, being an integrally molded article having a center bending type undivided dual-partitioning structure, is molded to include, at least, projections 117a and 117b which are engaged with grooves 114a and 114b formed in the inner surface of the upper surface 114, and elastic pieces 117c and 117d which are engaged with notches 116a and 116b formed in a peripheral edge of the electronic substrate 116. Furthermore, the inner plate 117 is placed on the electronic substrate 116 in a bent condition (the condition in FIG. 10A), and it is arranged in such a way that, by applying a force such as to eliminate the bent condition (refer to the outline arrow in FIG. 10A) to the inner plate 117, as well as the projections 117a and 117b of the inner plate 117 being engaged with the grooves 114a and 114b of the upper casing 114, the elastic pieces 117c and 117d of the inner plate 117 are engaged with the notches 116a and 116b of the electronic substrate 116.

In the fourth related art, the inner plate 117 is put into the bent condition and placed on the electronic substrate 116 and, simply by carrying out the operation of applying a force such as to eliminate the bent condition, it is possible to integrate the upper casing 114, the sealing rubber 115 and the electronic substrate 116. Then, as no unnecessary friction occurs between the sealing rubber 115 and the upper casing 114 at a time of the integration, it is possible to resolve the disadvantage of the heretofore described third related art, that is, damage to (a breakage or the like of) the sealing rubber 115.

However, in the heretofore described fourth related art, there is room for improvement for the following reason.

In the fourth related art, in the inner plate 117 after having the bent condition eliminated, although it maintains a straightened condition in an approximately flush aspect along the electronic substrate 116, the maintenance of the straightened condition is carried out exclusively by the engagement between the elastic pieces 117c and 117d formed on the inner plate 117 and the notches 116a and 116b of the electronic substrate 116. These elastic pieces 117c and 117d are components indispensable and essential to the fourth related art. This fact can be easily understood by imagining a case in which there is no elastic piece 117c or 117d. This is because, even in the event that the bent condition has been eliminated by applying the force to the inner plate 117, when the force is removed, the inner plate 117 is restored to the original condition (the bent condition) by its own restoring force.

In this way, although the elastic pieces 117c and 117d formed on the inner plate 117 are items essential to the fourth related art, there is room for improvement in that an existence of the elastic pieces 117c and 117d causes a decrease in a mounting area of the electronic substrate 116.

FIG. 11 is a view showing a problem of the fourth related art. That is, as the elastic pieces 117c and 117d of the inner plate, as shown in the figure, are arranged in such a way as to be fit in the notches 116a and 116b formed in either side surface of the electronic substrate 116, the mounting area of the electronic substrate 116 decreases by an amount of a formation area of the notches 116a and 116b. The decrease in the mounting area may be extremely small. However, as a portable transmitter, particularly the remote keyless entry system transmitter, tends to require a further miniaturization, even the extremely small decrease in the mounting area cannot be overlooked.

SUMMARY OF THE INVENTION

Therefore, the invention relates to a structure capable of reliably preventing a dropping off of an electronic substrate when replacing a battery by disassembling a casing, and an object thereof is to provide a structure of housing a battery etc. arranged in such a way as to be able to realize the relevant structure without involving a complication of a manufacturing process, moreover, without involving either damage to a sealing rubber or, in addition, a decrease in a mounting area of an electronic substrate.

A structure of housing a battery etc. according to the invention, includes: a casing; a sealing rubber which covers an inner surface of the casing; an electronic substrate fitted inside the sealing rubber; and an inner plate for preventing a dropping off of the electronic substrate and housing a battery, wherein the inner plate, as well as having a structure which can take an aspect of a bent condition, in which it is bent with a thin-walled parting line portion as a border, or a straightened condition, in which it is in an approximately flush aspect, has one or more long holes, and has provided on one longitudinal edge of the long holes, arms of which proximal portions are swingably attached thereto, and furthermore, on the other longitudinal edge of the long holes, engagement portions which can be engaged with leading ends of the arms.

As used herein, the "bent condition" refers to a condition in which the inner plate is bent in a dogleg shape (refer to FIG. 4A).

In the invention, simply by carrying out an easy operation of putting the inner plate into the bent condition, placing it on the electronic substrate, and applying a force such as to eliminate the bent condition, it is possible to integrate the casing, the sealing rubber and the electronic substrate.

According to the invention, by integrating the casing, the sealing rubber and the electronic substrate by means of the inner plate, it is possible to reliably prevent a dropping off of the electronic substrate when replacing the battery by disassembling the casing.

Moreover, such integration can be realized simply by carrying out the simple operation of putting the inner plate into the bent condition, placing it on the electronic substrate, and applying a force such as to eliminate the bent condition, and it does not happen that it involves the complication of the manufacturing process.

Furthermore, during such integration, as no strong frictional force is applied to the sealing rubber, there is no fear of damaging the sealing rubber, and a waterproofing performance is not affected, either.

In addition, as there is no need for engagement means (the elastic pieces 117c and 117d of the inner plate 117, and the notches 116a and 116b of the electronic substrate 116) between the inner plate and the electronic substrate, as in the fourth related art, it does not happen, either, that it involves the decrease in the mounting area of the electronic substrate.

DESCRIPTION OF PREFERRED EMBODIMENTS

Hereafter, a description will be given of an embodiment of the invention, with reference to the drawings. A specification or examples of various details, and an illustration of numeric values, letter strings and other symbols, in the following description, are merely references for clarifying the spirit of the invention, and it is obvious that the spirit of the invention is not restricted by all or any of them. Also, although a detailed description of a well known method, a well known procedure, a well known architecture, a well known circuit configuration and the like (hereafter referred to as "well known items") is avoided, this is also for brevity of description, and not for purposefully excluding all or any of these well known items. Such well known items, as they can be known by those skilled in the art at a time of filing of the invention, are naturally included in the following description.

Figure 1:
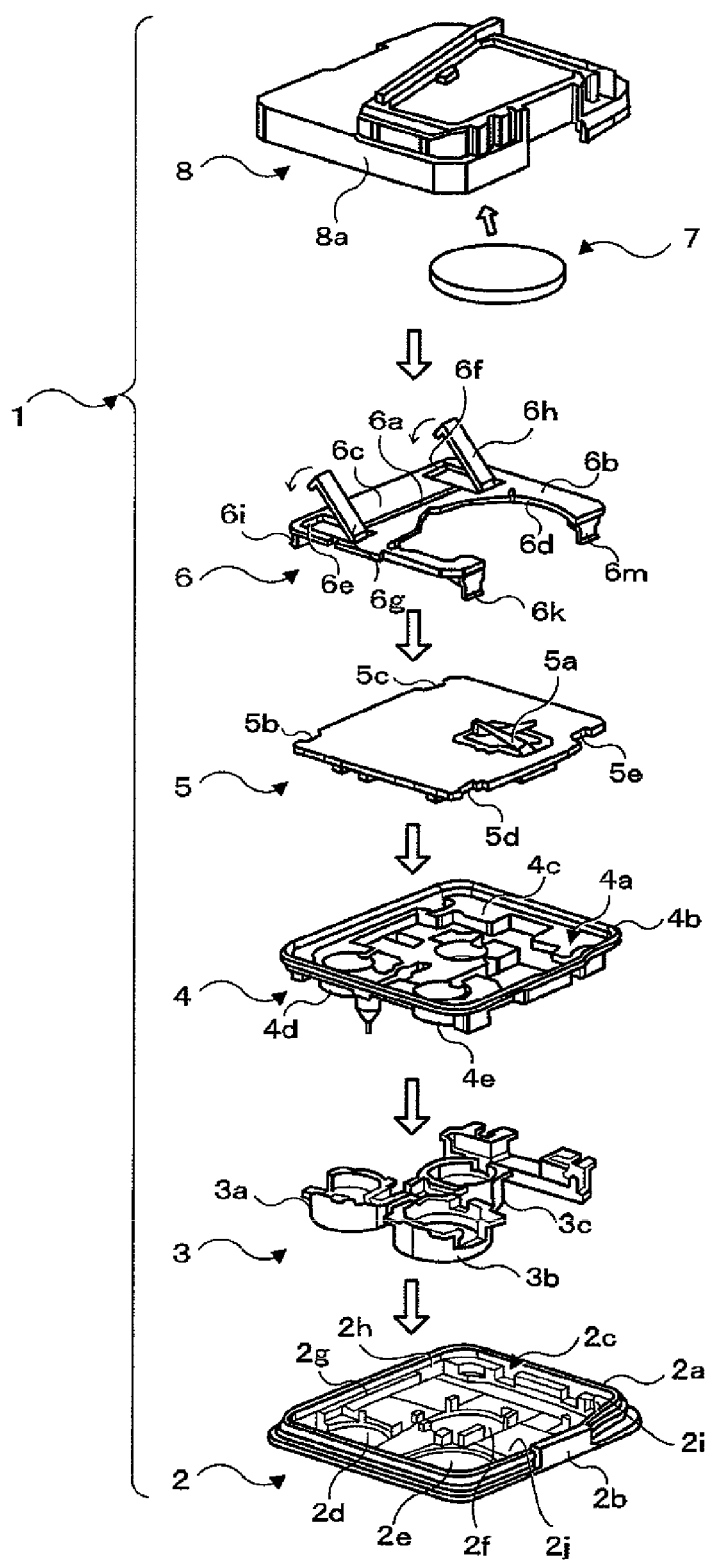
FIG. 1 is an assembly diagram of a transmitter 1 of an embodiment.

FIG. 1 is an assembly diagram of a transmitter 1 of the embodiment. In the figure, the transmitter 1 is assembled by sequentially stacking a button knob 3, into which locking and unlocking buttons and the like are integrally molded, a waterproof sealing rubber 4, an electronic substrate 5, an inner plate 6 for preventing a dropping off of the electronic substrate 5 and housing a battery 7, and a lower casing 8, on which is mounted the battery 7, on a rear surface side of an inverted upper casing 2. As used herein, the term "upper" in the upper casing 2 refers to a button operating surface (commonly, a surface facing upward) for when using the transmitter 1, and the term "lower" in the lower casing 8 refers to a surface opposite thereto (a rear surface). When assembling the transmitter 1, the button operating surface of the upper casing 2 is placed on a work table or the like, and placed in the condition shown in the figure (in an inverted condition), and the button knob 3, the sealing rubber 4, the electronic substrate 5, the inner plate 6 and the lower casing 8 are stacked thereon.

To describe details of each portion, firstly, in the upper casing 2, a space portion 2c for housing the button knob 3, the sealing rubber 4, the electronic substrate 5 and the inner plate 6 is defined inside a rectangular main body 2b enclosed with a sidewall 2a on its perimeter. A plurality of button holes 2d, 2e and 2f are opened in a bottom surface of the space portion 2c, and furthermore, four grooves 2g, 2h, 2i and 2j for retaining the inner plate 6 are formed in portions of a side periphery of the space portion 2c.

Next, the button knob 3, a whole of which is molded from a hard elastic body of hard rubber or the like, has push buttons 3a, 3b and 3c corresponding, respectively, to the plurality of button holes 2d, 2e and 2f formed in the bottom surface of the space portion 2c of the upper casing 2. The push buttons 3a, 3b and 3c, in a condition in which the assembly of the transmitter 1 is complete, are exposed to an exterior through the plurality of button holes 2d, 2e and 2f formed in the bottom surface of the space portion 2c of the upper casing 2, and depressed by a user.

Next, the sealing rubber 4, being molded from a soft elastomer of soft rubber or the like, has a portion of housing the substrate etc. 4a, having a box shape with a bottom, only a top of which is opened, and a flange 4b which, at a time of elastic engagement of the upper casing 2 with the lower casing 8, is nipped between their peripheral edges, and carries out a waterproofing by blocking the substrate etc. housing portion 4a from external air in a condition in which the upper casing 2 is elastically engaged with the lower casing 8.

A stepped portion 4c for placing the electronic substrate 5 on is formed on a side surface of the substrate etc. housing portion 4a, and an appropriate number of columnar projections 4d, 4e (only two can be seen in the figure) corresponding to a plurality of the push buttons 3a, 3b and 3c of the button knob 3 are formed on a bottom surface thereof.

Next, the electronic substrate 5, being one mounted with an electronic circuit necessary for an operation of the transmitter 1, has mounted, on a front surface or front and rear surfaces of a printed substrate, various kinds of element (not shown) such as a semiconductor integrated circuit, a resistor, and a capacitor, electrodes 5a for the battery, and furthermore, push button switches (which is hidden out of sight at the back) corresponding to the plurality of push buttons 3a, 3b and 3c of the button knob 3. Four notches 5b, 5c, 5d and 5e, being formed in opposed edges of the electronic substrate 5, are used as recesses through which to pass pawls 6i, 6j, 6k and 6m, to be described hereafter, of the inner plate 6.

Next, a whole of the inner plate 6 is integrally molded from a synthetic resin such as, for example, an ABS resin, polycarbonate, polypropylene or modified PPO. In the case of this example, the inner plate 6 being divided into a first plate 6b and a second plate 6c with a thin-walled parting line portion 6a as a border between them, the two plates (the first plate 6b and the second plate 6c) are arranged in such a way as to be bendable into a dogleg shape at the parting line portion 6a.

A circular hole 6*d* of a slightly larger size than a diameter of the battery 7 being formed in the first plate 6*b*, it is arranged in such a way that the battery 7 is mounted in the circular hole 6*d* after the assembly of the transmitter 1. Also, two long holes 6*e* and 6*f* being formed from the first plate 6*b* over to the second plate 6*c*, L-shaped arms 6*g* and 6*h* are integrally attached to first plate 6*b* side edges of the long holes 6*e* and 6*f*, respectively. The L-shaped arms 6*g* and 6*h*, although they are normally in a condition in which leading end portions are suspended in the air, are arranged in such a way that, by pushing the leading end portions into the long holes 6*e* and 6*f* with a fingertip or the like, the leading end portions are engaged with edges of the long holes 6*e* and 6*f*, and a required pressure is applied in a longitudinal direction of the long holes 6*e* and 6*f*. Details will be described hereafter.

Furthermore, the four pawls 6*i*, 6*j*, 6*k* and 6*m* being formed in the inner plate 6, in a condition after the assembly of the transmitter 1, these pawls 6*i*, 6*j*, 6*k* and 6*m* are engaged with the four grooves 2*g*, 2*h*, 2*i* and 2*j* via the four notches 5*b*, 5*c*, 5*d* and 5*e* of the electronic substrate 5.

Finally, the lower casing 8, having a sidewall 8*a* fitted in an outer side of the sidewall 2*a* of the upper casing 2, is arranged in such a way that, in the condition after the assembly of the transmitter 1, the sidewall 8*a* is elastically engaged with the sidewall 2*a* of the upper casing 2 after housing the button knob 3, the sealing rubber 4, the electronic substrate 5 and the inner plate 6 by, for example, a snap fitting.

Figure 2:
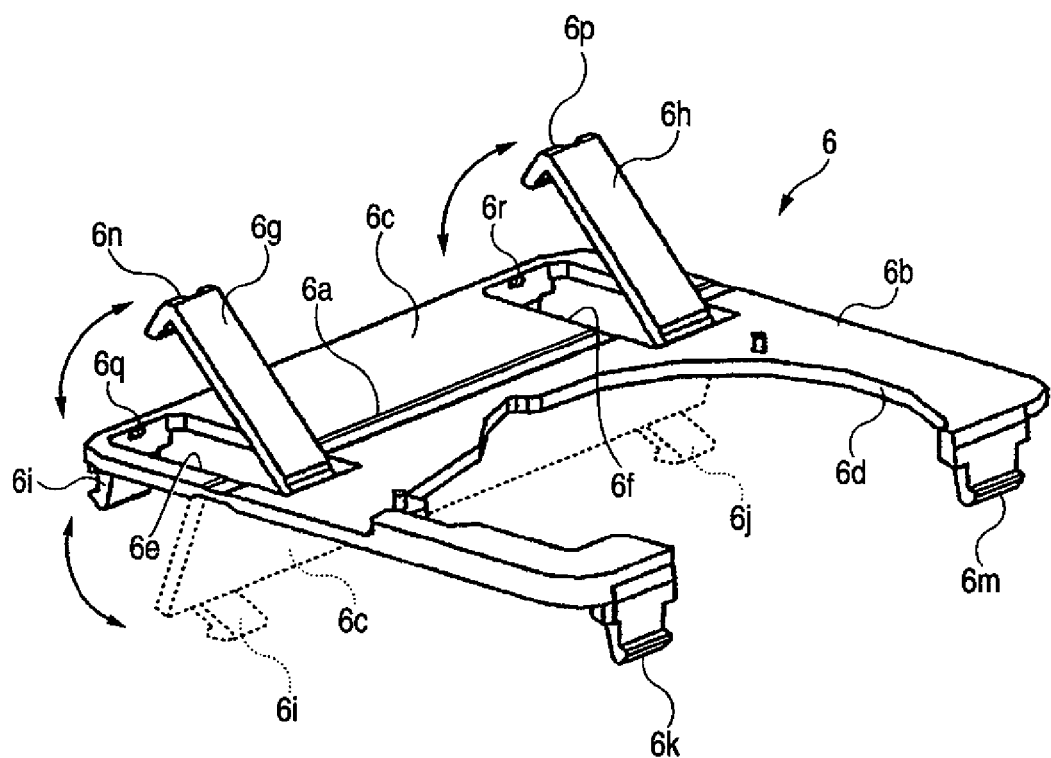
FIG. 2 is a detailed structural view of an inner plate 6.
Figure 3:
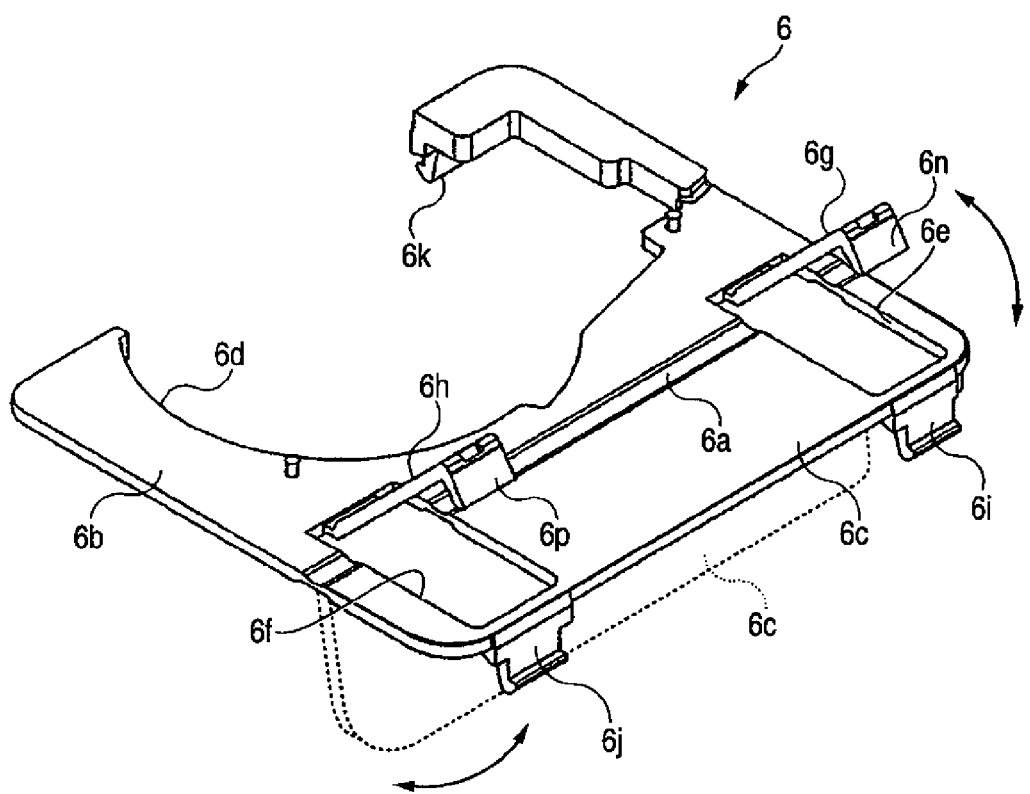
FIG. 3 is a detailed structural view of the inner plate 6.

FIGS. 2 and 3 are detailed structural views of the inner plate 6. As described previously too, the inner plate 6 being divided into the first plate 6*b* and the second plate 6*c* with the thin-walled parting line portion 6*a* as the border between them, the inner plate 6 is arranged in such a way as to be bendable into the dogleg shape at the parting line portion 6*a* at a normal time (a time before it is fitted into the transmitter 1). The second plate 6*c* shown in broken lines represents this bent condition.

The two long holes 6*e* and 6*f* are formed straddling the parting line portion 6*a* of the inner plate 6, and furthermore, the inner plate 6 includes the L-shaped arms 6*g* and 6*h*, proximal ends of which are swingably attached to one longitudinal edge of the long holes 6*e* and 6*f*, and engagement portions (projections 6*q* and 6*r*) which, being formed on the other longitudinal edge of the long holes 6*e* and 6*f*, can be engaged with leading ends (the leading end portions 6*n* and 6*p*) of the L-shaped arms 6*g* and 6*h*.

The two L-shaped arms 6*g* and 6*h*, although they are in the condition in which the leading end portions 6*n* and 6*p* are suspended in the air at the normal time, are arranged in such a way that, by pushing the leading end portions 6*n* and 6*p* into the long holes 6*e* and 6*f* with the fingertip or the like, the leading end portions 6*n* and 6*p* are engaged with the small projections 6*q* and 6*r* formed on the edges of the long holes 6*e* and 6*f*, and the required pressure is applied in the longitudinal direction of the long holes 6*e* and 6*f* while the engaged condition is being maintained. This pressure being, to express it simply, a 'tension', the inner plate 6 bent into the dogleg shape is arranged in such a way as to receive the "tension", eliminate a dogleg deformation, and maintain an approximately straight condition (an aspect in which the first plate 6*b* is approximately flush with the second plate 6*c*. That is, it is a straightened condition).

Figure 4A:
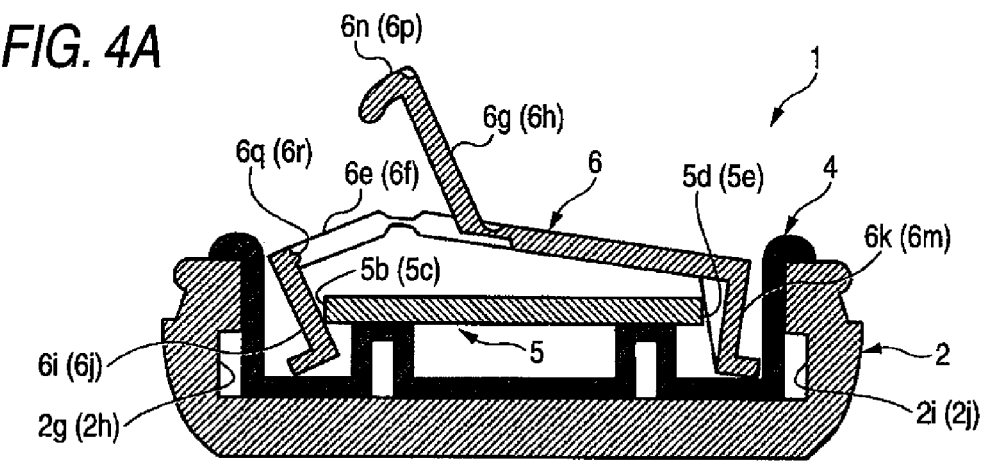
FIGS. 4A to 4C are illustration of prevention of a dropping off of an electronic substrate 5 by means of the inner plate 6.
Figure 4B:
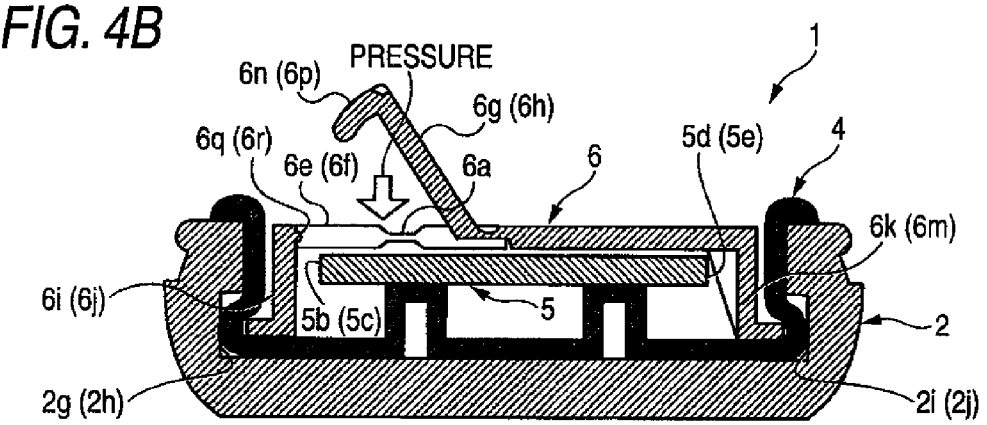
Figure 4C:
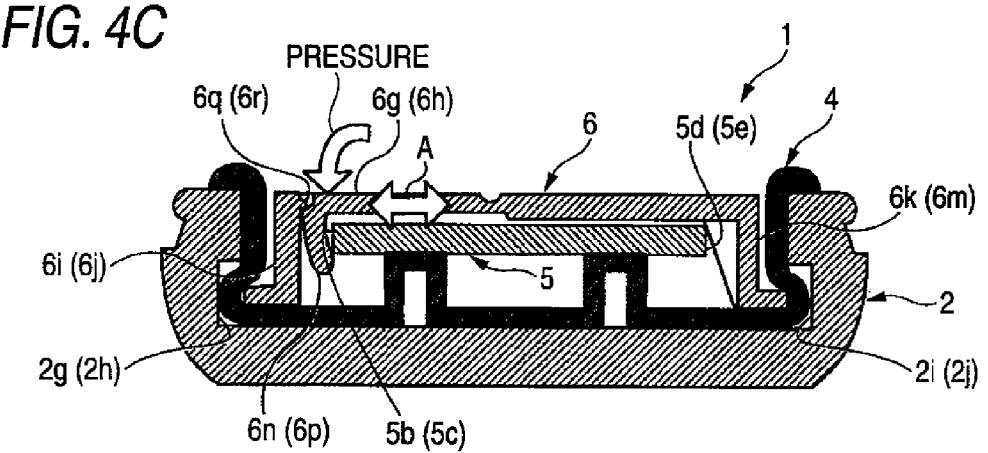

FIGS. 4A to 4C are illustration of the prevention of the dropping off of the electronic substrate 5 by means of the inner plate 6. The button knob 3 is omitted from this figure. Firstly, as shown in FIG. 4A, the sealing rubber 4 is set in the upper casing 2, and the electronic substrate 5 is placed on that sealing rubber 4. After that, the inner plate 6 bent into the dogleg shape is put on the electronic substrate 5, and the four pawls 6*i*, 6*j*, 6*k* and 6*m* of the inner plate 6 are inserted, via the notches 5*b*, 5*c*, 5*d* and 5*e* of the electronic substrate 5, until they make contact with the sealing rubber 4.

Next, as shown in FIG. 4B, the bent condition is temporarily released by pushing a vicinity of the parting line portion 6*a* of the inner plate 6 from above, providing the straightened condition in the approximately flush condition. Then, while keeping the straightened condition, as shown in FIG. 4C, by pushing the leading end portions 6*n* and 6*p* of the L-shaped arms 6*g* and 6*h* of the inner plate 6, they are pushed into the long holes 6*e* and 6*f* of the inner plate 6, and the leading end portions 6*n* and 6*p* of the L-shaped arms 6*g* and 6*h* are engaged with the small projections 6*q* and 6*r* formed on the edges of the long holes 6*e* and 6*f*.

On the leading end portions 6*n* and 6*p* of the L-shaped arms 6*g* and 6*h* being engaged with the projections 6*q* and 6*r* of the long holes 6*e* and 6*f* in this way, a horizontal "tension", as shown by both outline arrows A in the figure, acts on the inner plate 6. Consequently, the inner plate 6, even after the pushing force from above is removed, is left maintaining the condition at that time (the straightened condition in the approximately flush condition) and, as a result, it is possible to prevent the dropping off of the electronic substrate 5 by means of the inner plate 6.

Figure 10A:
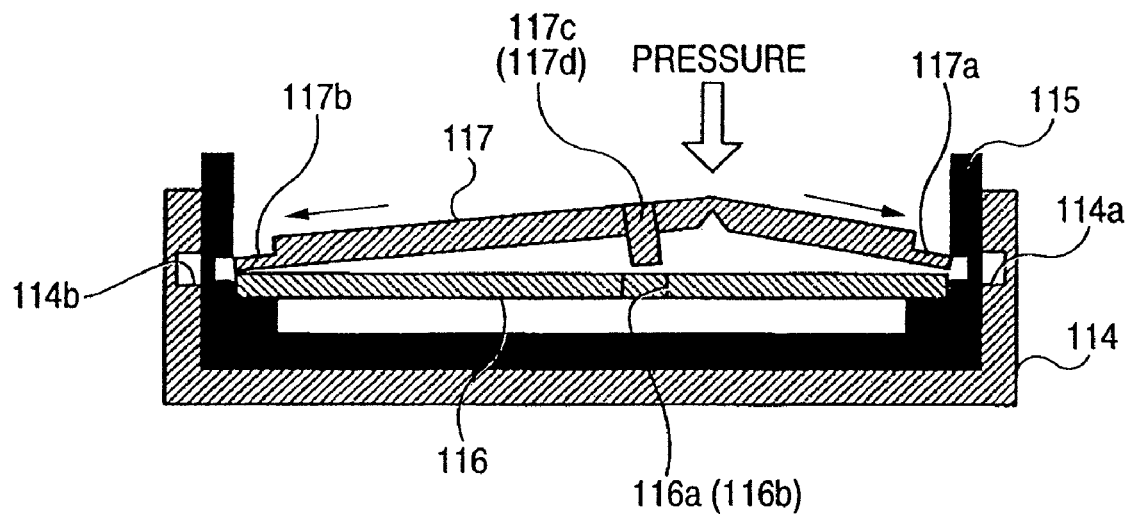
FIGS. 10A and 10B are views showing a fourth related art.
Figure 10B:
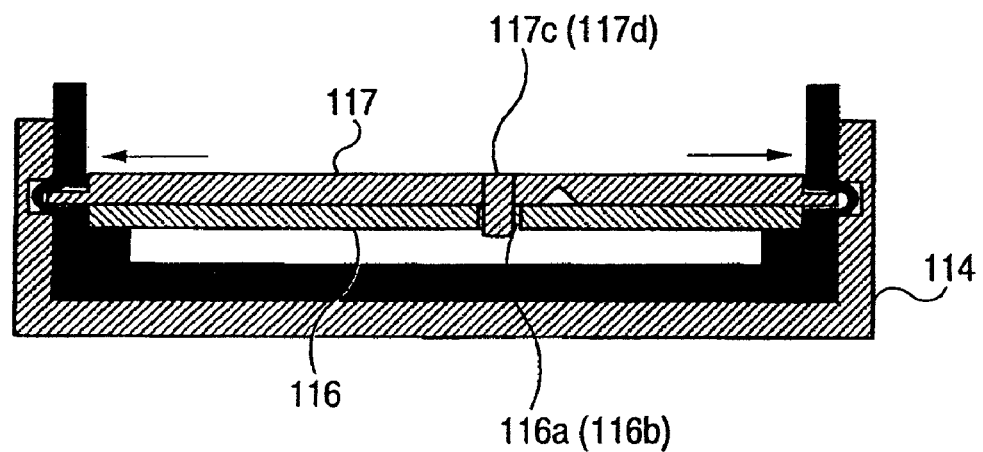
Figure 11:
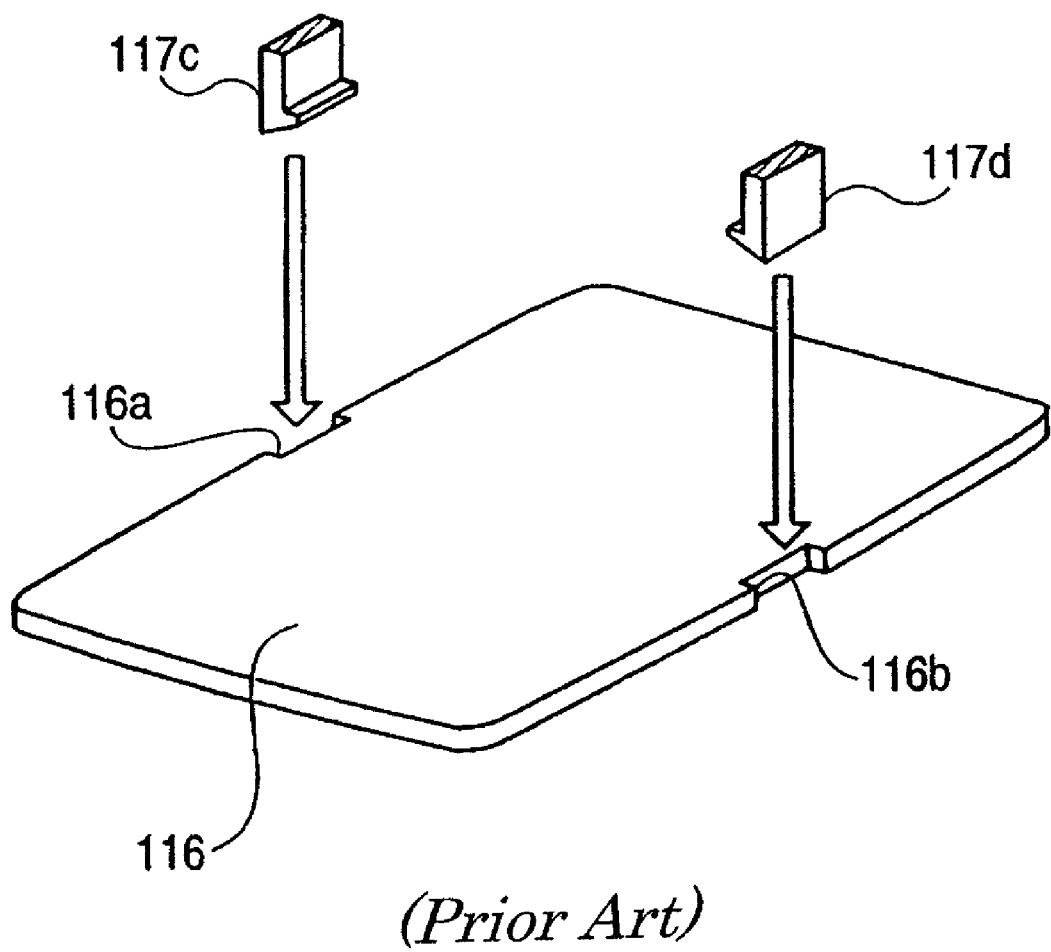
FIG. 11 is a view showing a problem of the fourth related art.

Herein, let us compare the embodiment and the heretofore described fourth related art. In the heretofore described fourth related art (refer to FIGS. 10A and 10B), the maintenance of the straightened condition of the inner plate 117 after eliminating the bent condition is exclusively carried out by the engagement between the elastic pieces 117*c* and 117*d* formed on the inner plate 117 and the notches 116*a* and 116*b* of the electronic substrate 116. As opposed to this, in the embodiment, there is no need for that kind of engagement means (the engagement between the elastic pieces 117*c* and 117*d* formed on the inner plate 117 and the notches 116*a* and 116*b* of the electronic substrate 116). Instead, it is arranged in such a way as to maintain the heretofore described "straightened condition" by causing the "tension" to act on the inner plate 6 itself.

Consequently, in the embodiment, as it does not have engagement means such as the one in the fourth related art, the notches 116*a* and 116*b* of the electronic substrate 116 are unnecessary and, as a result, a mounting area of the electronic substrate 5 increases by an amount of an area necessary for forming these notches 116*a* and 116*b*, eventually making it possible to obtain a special advantage of being able to resolve the disadvantage of the heretofore described fourth related art (the decrease in the mounting area of the electronic substrate 5).

In the embodiment, as shown in FIG. 1, the four notches 5*b*, 5*c*, 5*d* and 5*e* are formed on the opposite sides of the electronic substrate 5, and these notches 5*b*, 5*c*, 5*d* and 5*e* are used as the recesses through which to pass the pawls 6*i*, 6*j*, 6*k* and 6*m* of the inner plate 6. For this reason, depending on the perspective, it is also conceivable that a decrease occurs in the mounting area of the electronic substrate 5 by an amount of the formation of these four notches 5*b*, 5*c*, 5*d* and 5*e* but, as such four notches 5*b*, 5*c*, 5*d* and 5*e* are not essential to the embodiment, there is no worry of this kind. That is, this is because the four notches 5*b*, 5*c*, 5*d* and 5*e* formed in the electronic substrate 5 are for arranging in such a way that the electronic substrate 5 does not prevent the four pawls 6*i*, 6*j*, 6*k* and 6*m* of the inner plate 6 from being inserted until they make contact with the sealing rubber 4 (refer to FIG. 4A), and it is not necessary to actively form these notches 5*b*, 5*c*, 5*d* and 5*e* as long as the four pawls 6*i*, 6*j*, 6*k* and 6*m* of the inner plate 6 can be inserted even without them. Alternatively, this is because, granting that these four notches 5b, 5c, 5d and 5e are formed, by causing them to have a minimal size with which the pawls 6i, 6j, 6k and 6m can be inserted, it is possible to minimize the amount of the decrease in the mounting area of the electronic substrate 5.

As described heretofore, according to the embodiment, it is possible to obtain the following advantages.

Figure 7:
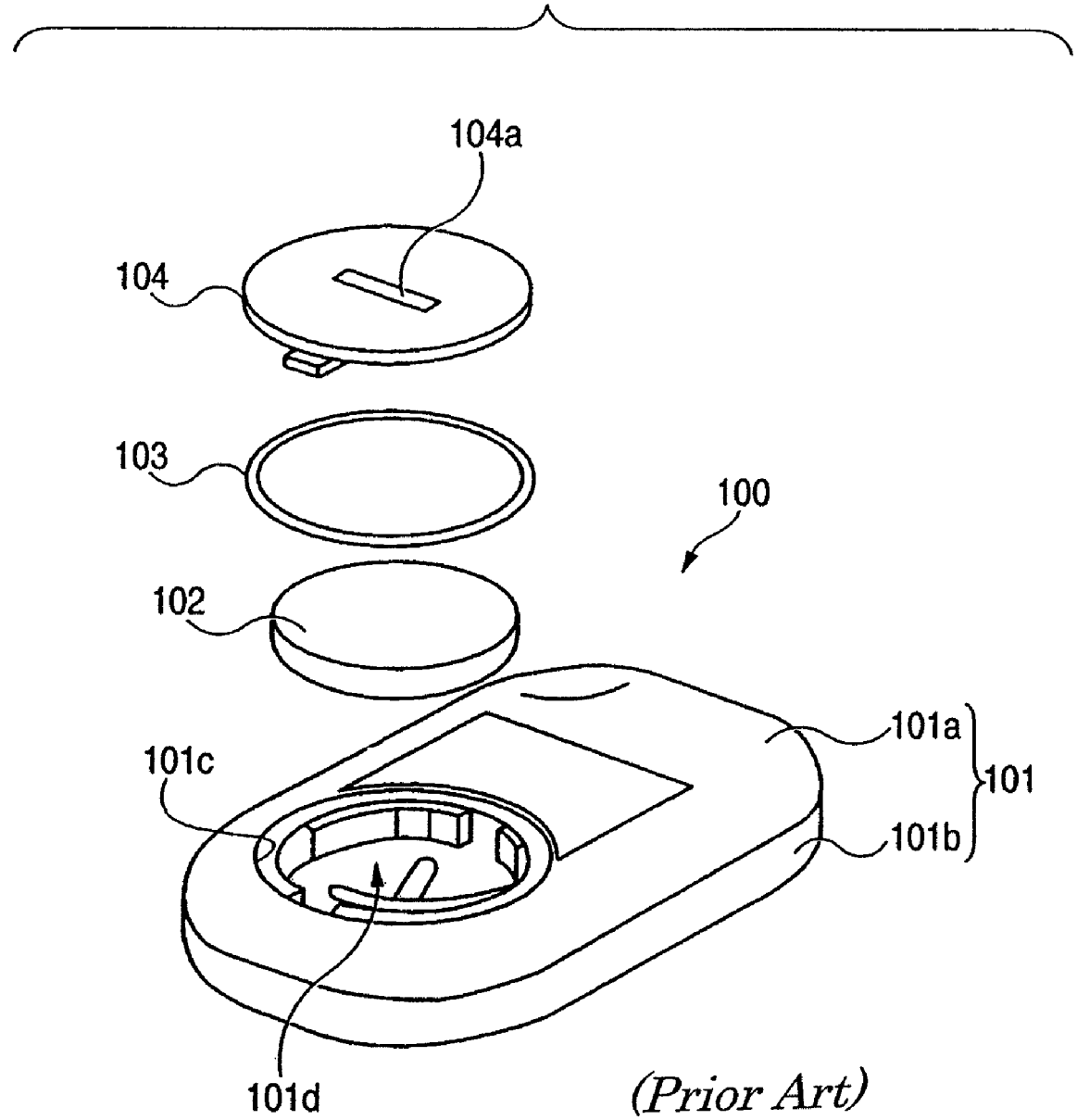
FIG. 7 is a view showing a first related art.
Figure 8:
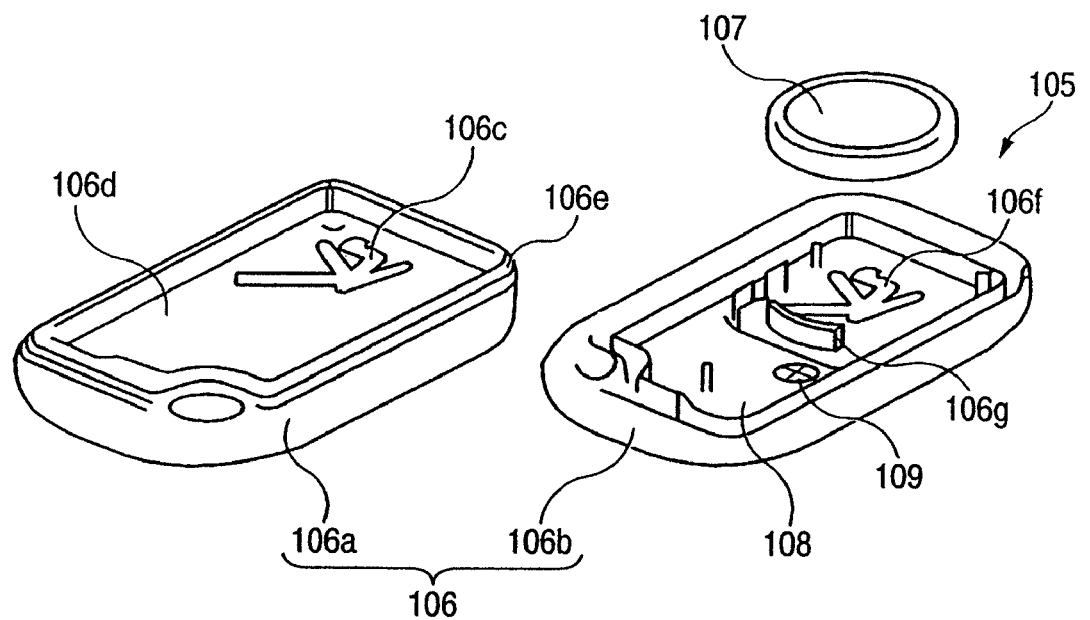
FIG. 8 is a view showing a second related art.
Figure 9:
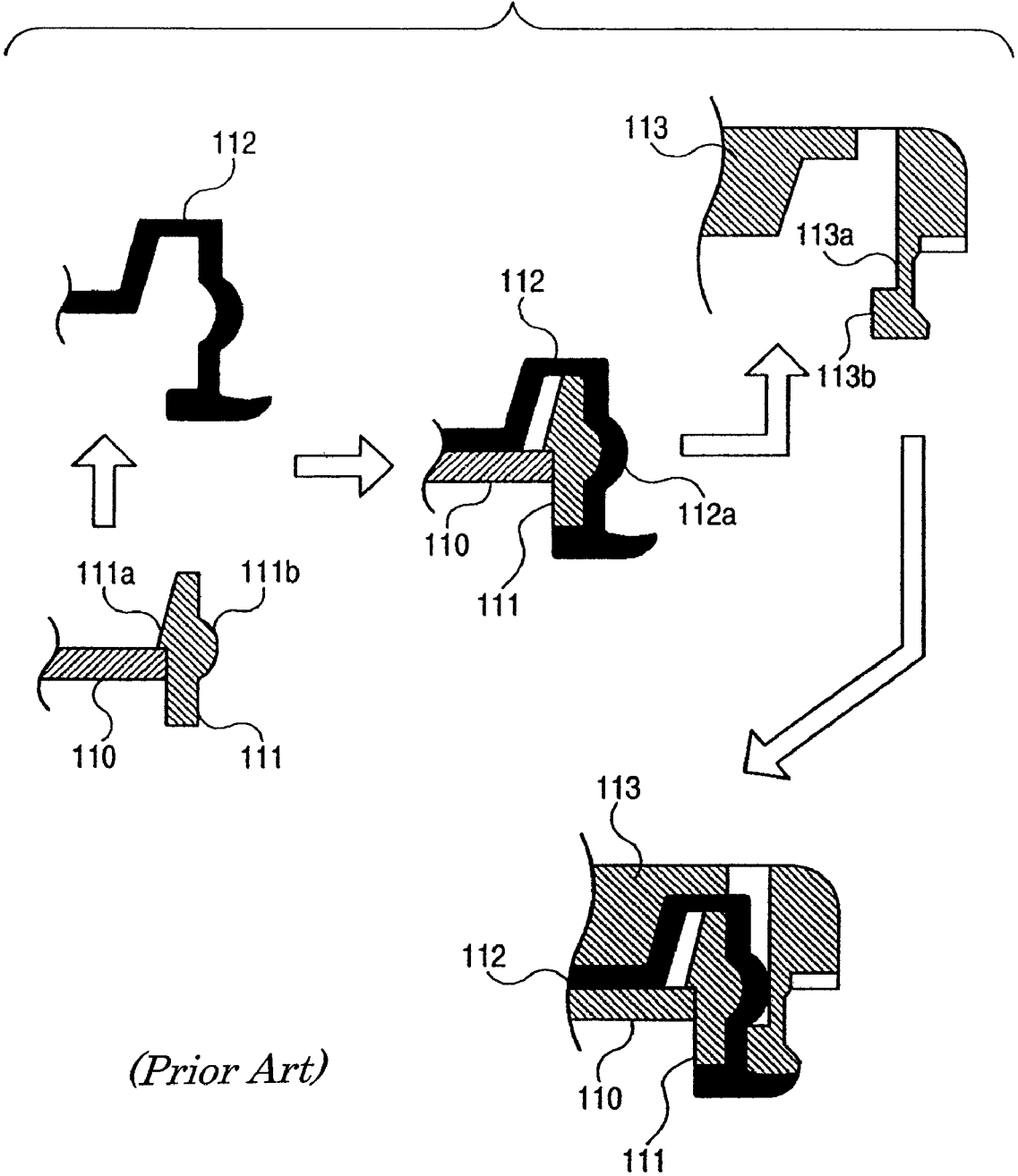
FIG. 9 is a view showing a third related art.

(1) As a circular lid for battery replacement (refer to reference numeral 104 of FIG. 7) does not exist, it being possible to secure sufficient empty space on the front surface of the upper casing 2 or the lower casing 8, a degree of freedom of attachment of a maker emblem, a radiowave authentication seal or the like is high.

(2) As a waterproof place is limited to only one place: the peripheral edges of the upper casing 2 and the lower casing 8, and moreover, the waterproof place is reliably sealed with the flange 4b of the sealing rubber 4, it is possible to secure a reliable waterproofing performance.

(3) When replacing the battery 7, it is possible to easily replace the battery 7 simply by inserting a coin, a fingernail or the like in the elastic engagement portion between (the peripheral edges of) the upper casing 2 and the lower casing 8, separating one from the other, and removing the lower casing 8.

(4) In addition, when replacing the battery 7, as the inner plate 6, the electronic substrate 5, the sealing rubber 4, the button knob 3 and the upper casing 2 maintain an integrated condition (refer to FIG. 4C), it is possible to avoid the dropping off of the electronic substrate 5.

(5) Moreover, as the electronic substrate 5 is hidden under the inner plate 6, the electronic substrate 5 is not exposed, so there is no problem of erroneously touching the electronic substrate 5 with a hand, or the like. For this reason, it is possible to avoid an electrical failure (an isolation failure, an occurrence of rusting, or the like due to an attachment of grease or moisture of a finger) of the electronic substrate 5.

(6) When assembling the transmitter 1, a strong force is applied to the sealing rubber 4 by the pawls 6i, 6j, 6k and 6m of the inner plate 6, but a direction of the force application is a "thickness direction" (refer to FIGS. 4B and 4C) of the sealing rubber 4, and not a direction in which a friction occurs as in the heretofore described third related art. Consequently, as compared with the heretofore described third related art, there is less fear of damage to the sealing rubber 4, and it is possible to maintain the reliable waterproofing performance for a long period.

(7) Furthermore, as it is arranged in such a way as to, by pushing the two L-shaped arms 6g and 6h of the inner plate 6 into the long holes 6e and 6f, cause the "tension" to act on the inner plate 6 itself, and maintain the straightened condition of the inner plate 6, it is not necessary that the elastic pieces 117c and 117d and the notches 116a and 116b, as in the fourth related art, are formed on the inner plate 6 and the electronic substrate 5. For this reason, it is possible to avoid the decrease in the mounting area of the electronic substrate 5.

In the above description, the "two" L-shaped arms 6g and 6h are formed on the inner plate 6, but this is merely one example. It is also acceptable that the number of arms is more than two, or one. Also, it is not essential that the leading end of the arm is L-shaped.

Figure 5:
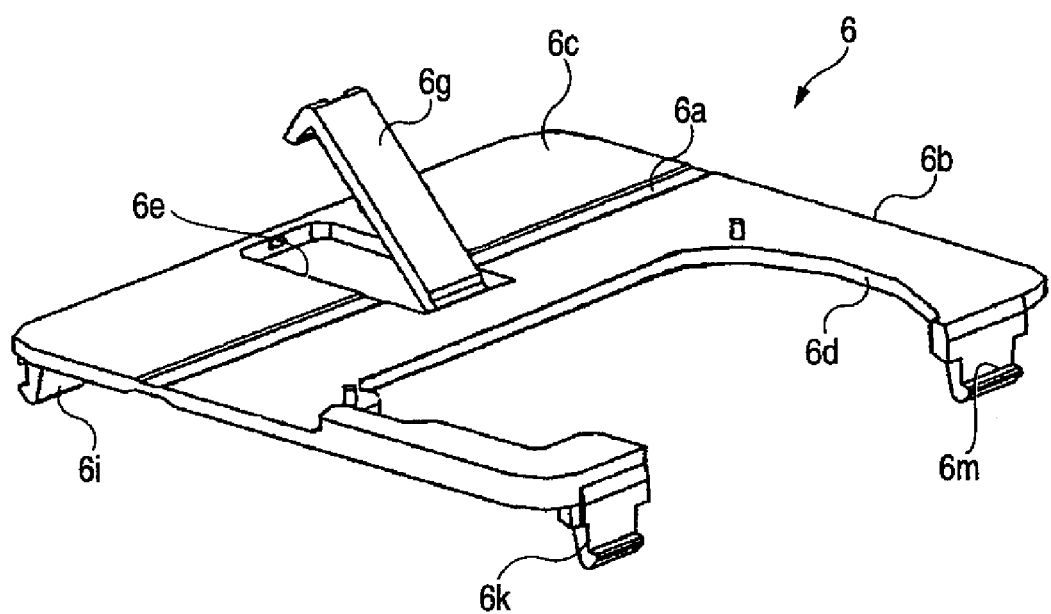
FIG. 5 is another detailed structural view of the inner plate 6.
Figure 6:
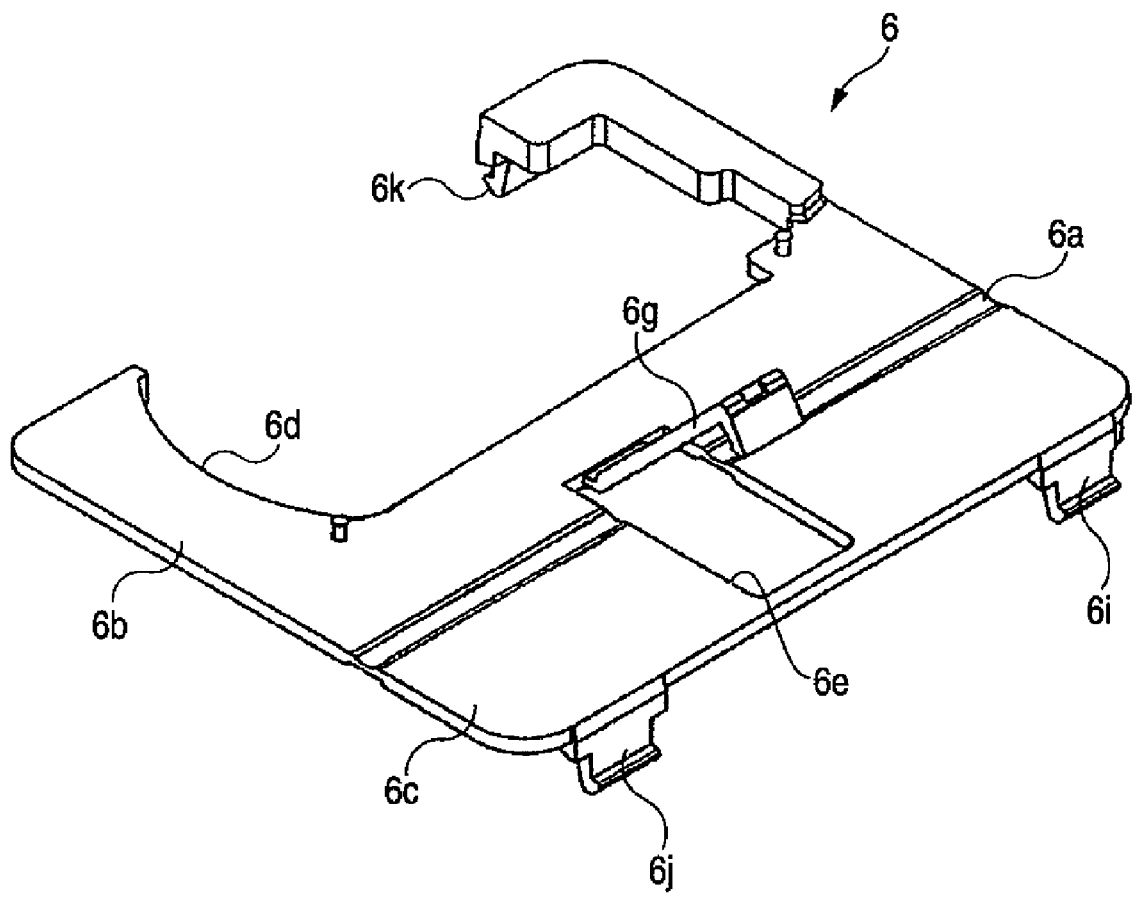
FIG. 6 is another detailed structural view of the inner plate 6.

FIGS. 5 and 6 are other detailed structural views of the inner plate 6. In the same way as the heretofore described FIGS. 2 and 3, this inner plate 6 is also divided into a first plate 6b and a second plate 6c with a thin-walled parting line portion 6a as a border between them, and has four pawls 6i, 6j, 6k and 6m and a circular hole 6d for mounting the battery 7, but it differs in that there is one long hole 6e and L-shaped arm 6g. In this way, it is also acceptable to have one long hole 6e and one L-shaped arm 6g. However, as the number of long holes 6e and L-shaped arms 6g is increased, the "tension" acting on the inner plate 6 becomes stronger, and the "tension" acts uniformly along the parting line portion 6a, so it is desirable that there are two or more long holes 6e and L-shaped arms 6g but, in practice, it is sufficient to determine the number of long holes and L-shaped arms with costs in mind.

What is claimed is:

1. A structure of housing a battery, comprising:
   a casing;
   a sealing rubber which covers an inner surface of the casing;
   an electronic substrate fitted inside the sealing rubber; and
   an inner plate comprising:
   a first plate and a second plate connected by a thin-walled parting line portion,
   wherein the inner plate is bendable between a bent condition, in which the second plate is bent at the thin-walled parting line portion with respect to the first plate, and a straightened condition, in which the second plate is approximately flush with the first plate;
   one or more long holes straddling the thin-walled parting line portion;
   an arm swingably attached, at a proximal end, to one longitudinal edge of each of the long holes; and
   an engagement portion provided on the other longitudinal edge of each of the long holes that engage with a leading end of the one or more arms,
   wherein the engagement portion engages with the leading end in a gap formed between an edge of the electronic substrate and the sealing rubber such that the inner plate, in the straightened condition, provides contact pressure at both ends to the sealing rubber.

2. The structure of housing a battery according to claim 1, wherein proximal ends of the one or more arms are offset from the thin-walled parting line portion.

3. The structure of housing a battery according to claim 1, wherein the one or more arms are L-shaped.

4. The structure of housing a battery according to claim 2, wherein the one or more arms are L-shaped.

5. The structure of housing a battery according to claim 1, wherein, by swinging the one or more arms into engagement with the respective engagement portions, the engagement mechanically forces the inner plate to be maintained in the straightened condition.

6. The structure of housing a battery according to claim 2, wherein, by swinging the one or more arms into engagement with the respective engagement portions, the engagement mechanically forces the inner plate to be maintained in the straightened condition.

* * * * *